(12) United States Patent
Dimitroff

(10) Patent No.: US 8,641,326 B2
(45) Date of Patent: Feb. 4, 2014

(54) METHOD OF REPLACING AN UNDERGROUND PIPE SECTION

(76) Inventor: Ted R. Dimitroff, Columbia, MO (US)

( * ) Notice: Subject to any disclaimer, the term of this patent is extended or adjusted under 35 U.S.C. 154(b) by 0 days.

(21) Appl. No.: 13/370,490

(22) Filed: Feb. 10, 2012

(65) Prior Publication Data

US 2012/0219363 A1    Aug. 30, 2012

Related U.S. Application Data

(60) Provisional application No. 61/446,710, filed on Feb. 25, 2011.

(51) Int. Cl.
*F16L 55/18* (2006.01)

(52) U.S. Cl.
USPC ............. 405/184.1; 405/184.3; 405/184.4; 405/156

(58) Field of Classification Search
USPC ............. 405/184, 184.1, 184.3, 156, 184.4; 175/62, 57
See application file for complete search history.

(56) References Cited

U.S. PATENT DOCUMENTS

| | | | | |
|---|---|---|---|---|
| 574,661 A | * | 1/1897 | Carroll | 175/53 |
| 4,412,673 A | * | 11/1983 | Ramsden et al. | 254/134.3 FT |
| 5,507,597 A | * | 4/1996 | McConnell | 405/156 |
| 5,580,188 A | * | 12/1996 | Nowak | 405/184 |
| 6,732,816 B2 | | 5/2004 | Dimitroff | |
| 6,761,507 B2 | | 7/2004 | Wentworth et al. | |
| 6,792,820 B2 | * | 9/2004 | Wentworth et al. | 73/865.8 |
| 7,086,808 B2 | | 8/2006 | Wentworth et al. | |
| 7,255,516 B2 | * | 8/2007 | Wentworth et al. | 405/184.3 |
| 7,581,600 B1 | | 9/2009 | Dimitroff | |
| 7,674,072 B2 | | 3/2010 | Shook et al. | |

OTHER PUBLICATIONS

International Search Report & Written Opinion of the International Searching Authority completed and mailed Sep. 19, 2012, Applicant: Dimitroff, Ted R., Application No. PCT/US2012/024663 filed Feb. 10, 2012 (12 pages).

* cited by examiner

*Primary Examiner* — Thomas B Will
*Assistant Examiner* — Jessica H Lutz
(74) *Attorney, Agent, or Firm* — McKee, Voorhees & Sease, P.L.C.

(57) ABSTRACT

An improved method for replacing existing underground sewer pipe is accomplished without excavation, pipe bursting, or pipe reaming. First, vertical sight holes are drilled into the ground and through the existing pipe. Slurry material from the vertical hole drilling fills the old pipe. Then, a pilot hole is drilled in a first direction through the old pipe. Then, a reaming tool is pulled in the opposite direction so as to enlarge the pilot hole and grind out the old pipe, while simultaneously pulling the new pipe into position behind the reaming tool. The broken old pipe and slurry are vacuumed out of the vertical relief holes.

20 Claims, 1 Drawing Sheet

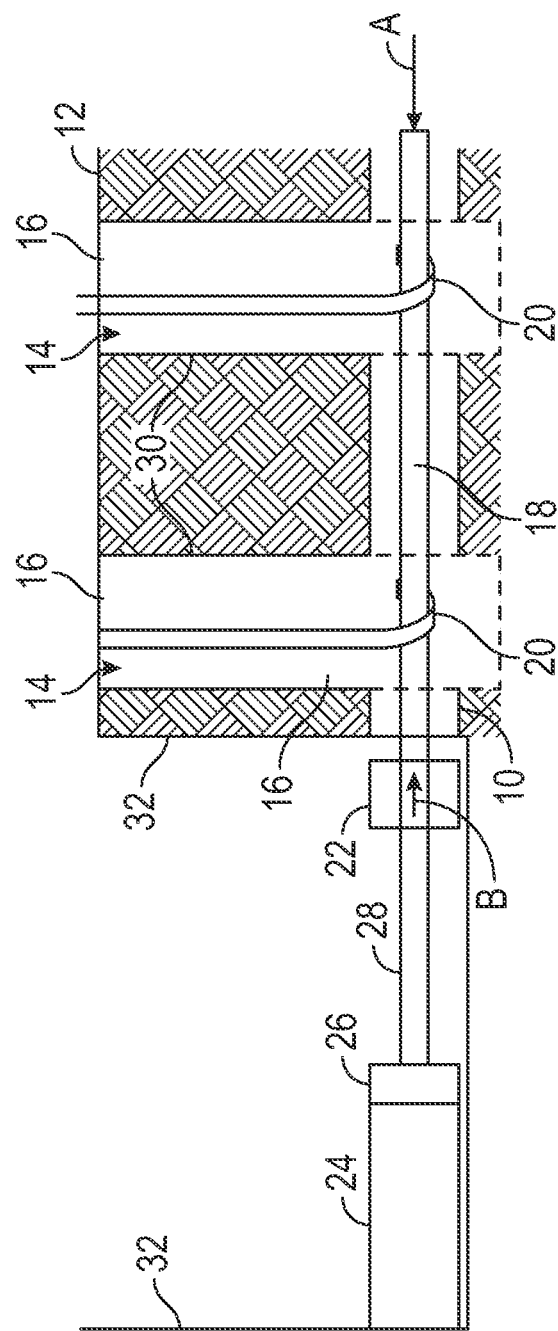

METHOD OF REPLACING AN UNDERGROUND PIPE SECTION

CROSS-REFERENCE TO RELATED APPLICATIONS

This application claims priority under 35 U.S.C. §119 to Provisional Application Ser. No. 61/446,710 filed Feb. 25, 2011, herein incorporated by reference in its entirety.

BACKGROUND OF THE INVENTION

Removal and replacement of existing gravity flow sewer pipes becomes necessary when the old pipe collapses or becomes blocked, or when the old pipe dips and sags so as to create flow restrictions. Sewer pipes traditionally have been made with clay, tile or concrete. Existing methods to remove and replace an existing sewer pipe include open excavation, pipe bursting and pipe reaming. Of these three methods, only open excavation, which is the most dominant, can insure that the new pipe will be installed at the proper grade. However, such excavation creates the most disruption within the communities where most replacement work is done.

Pipe bursting and pipe reaming both rely on the existing pipe for line and grade control. If the old existing pipe has dips or sags, these methods will typically follow the old pipe and the same dips and sags will reappear once the new pipe is installed. Pipe bursting and pipe reaming have no way of controlling the grade while installing the new pipe. Another disadvantage of pipe bursting and pipe reaming is the lack of good methods of lubricating the pipe for installation. Therefore, these methods use tools which are typically 1 inch or larger than the outside diameter of the new pipe to reduce the friction during installation of the new pipe. Such larger tools allow the new pipe to float out of grade, causing even more dips and sags within the new pipe, which is much more noticeable at tighter or flatter grades. Accuracy in any installation process for gravity flow sewers is essential for proper flow through the line. These pipe bursting and reaming methods are very limited in the kind of pipe which can be installed and the size of the installation.

Therefore, a primary objective of the present invention is the provision of an improved method for removing and replacing existing gravity flow sewer pipes.

Another objective of the present invention is the provision of an improved method of installing a new gravity flow sewer line.

A further objective of the present invention is the provision of a method to control the pilot stem during the removal and replacement of existing sewer pipes.

Another objective of the present invention is the provision of a method for installing a new sewer pipe by filling the existing sewer pipe with soil slurry material so as to provide a damping effect on the pilot stem while the pilot stem is supported within a vertically drilled hole to greatly reduce flopping, whipping or jumping off of the pilot stem on the support member during the back reaming removal and replacement process of the existing gravity flow sewer pipe.

Still another objective of the present invention is the provision of a method for supporting a boring tool during the back reaming process of the old existing sewer pipe so as to overcome gravity drop of the tooling to eliminate dips and sags in the replacement sewer pipe.

Another objective of the present invention is the provision of a method of removing old existing sewer pipe by filling the pipe with soil slurry material, grinding the pipe into particles, and forcing the slurry and pipe particles upwardly into vertically drilled holes, and vacuuming the mixture from the holes.

A further objective of the present invention is the provision of a method of removing and replacing an existing sewer pipe having close tolerance of not more than ½" between a bored hole that removes the old pipe and the new pipe outside diameter.

Still another objective of the present invention is the provision of a sewer pipe replacement method wherein any type of new pipe can be used and much larger pipe sizes can be installed.

Yet another objective of the present invention is the provision of an improved method of forming a trenchless flow line which is accurate and cost effective.

These and other objectives will become apparent from the following description of the invention.

SUMMARY OF THE INVENTION

The improved method of removing and replacing an existing gravity flow sewer pipe with a new pipe involves the initial step of making a series of substantially vertical sight relief holes through the ground and into the old pipe. Liquid is used during the vertical hole drilling, so that a slurry is created to fill the existing pipe. Then a pilot hole is drilled in a first direction through the pipe to each of the sight relief holes using a boring tool on a directional drilling machine. The boring tool is supported at each of the sight relief holes using a hook extending downwardly through the hole and into the old pipe so as to overcome the force of gravity on the boring tool. Once the old pipe is filled with soil slurry material the pilot stem is guided through the existing pipe until it reaches the opposite end. Current methods of using the support member tools in the vertical holes and spacing between the pipe and back reamer are used, as described in U.S. Pat. No. 7,581,600. The slurry within the existing pipe will act as a damping agent to prevent the pilot stem from jumping, whipping and flopping off of the support hooks used within the vertical holes. The slurry soil will also provide much needed lubrication to each hook tool to greatly reduce friction heat and abnormal wear. A back reaming tool is then pulled in the opposite direction through the pilot hole to break up the old pipe and form a bore with a diameter approximately ½" greater than the existing pipe diameter. The slurry soil within the existing pipe mixes with the broken pipe particles and flows or is vacuumed out of the vertical holes.

BRIEF DESCRIPTION OF THE DRAWING

FIG. 1 is a schematic view of the improved method for removing and replacing an underground pipe, according to the present invention.

DETAILED DESCRIPTION OF THE PREFERRED EMBODIMENT

The pipe replacement method of the present invention involves the grinding or breaking up of the old, existing pipe, followed by insertion or installation of a new pipe along the same pipe line. As seen in FIG. 1, the existing pipe 10 is buried beneath the surface of the ground 12. The first step of the method involves drilling a series or plurality of spaced apart, vertical sight relief holes 14 from the surface 12, through the existing pipe 10. Liquid is used in this drilling process to lubricate the drill and to form a slurry with the soil. The slurry fills the existing pipe, and may extend upwardly within the vertical sight relief holes 14. Then, a boring tool with a pilot stem 18 is used to drill a pilot hole in a first direction, indicated by arrow A in FIG. 1, through the slurry 16 in the existing pipe 10. A support member 20 is extending downwardly through each sight hole 14, with the lower end having a hook to support the pilot stem 18. The soil slurry 16 surrounds the pilot stem 18, and acts as a dampening agent to prevent the pilot stem 18 from whipping, jumping or flopping out of the support hooks 20. The support hooks 20 are similar to those described in Applicant's prior U.S. Pat. No. 7,581,600, which is incorporated herein by reference. The slurry 16 also lubricates the support hooks 20 to minimize friction and to prevent overheating and abnormal wear on the hooks 20 by the pilot stem 18.

Next, a back reaming tool 22 is attached to the pilot stem 18 and is pulled rearwardly along the existing pipe 10, as indicated by arrow B. The back reaming tool 22 has a diameter equal to or larger than the outside diameter of the existing pipe 10, such that the back reaming tool 22 breaks up or chips away the existing pipe 10 to form a bore hole. The new pipe 24 is secured to a pulling head 26 on the rear end of a spacing rod 28 (such as shown in U.S. Pat. No. 7,581,600). The spacing rod 28 is connected to the back reaming tool 22 so as to be pulled into the enlarged hole formed by the back reamer 22 as the old pipe 10 is reamed out. This one-step reaming and new pipe installation is similar to that described in Applicant's U.S. Pat. No. 6,732,816, which is incorporated herein by reference. Additional liquid can be used during the back reaming process to produce additional slurry. After the new pipe 24 is installed, the slurry 16 with the broken old pipe pieces can be removed through the sight holes 14 using a vacuum or other convenient means. It is understood that the diameter of the reaming tool 22 is slightly larger, approximately ½", than the diameter of the new pipe 24.

As seen in FIG. 1, each sight hole 14 is lined with a support tube 30. A work pit 32 with shoring protection is provided at one end of the existing pipe 10. The pilot stem 18 is moved from right to left in FIG. 1 through the existing pipe 10 to form the pilot hole in the slurry material 16 within the existing pipe 10. The back reaming tool 22 is then attached to the pilot stem 18, with the elongated spacing rod 28 connected to the back reaming tool 22, as in the U.S. Pat. No. 7,581,600. The back reaming tool 22 is then pulled rearwardly, from left to right in FIG. 1, through the old pipe 10 to form an enlarged hole in which the new pipe 24 follows the back reaming tool 22. The slurry 16 lubricates the back reaming tool 22 during the reaming step and is vacuumed or otherwise removed from the vertical holes 14 as the new pipe 24 is installed. The support hooks 20 are removed during the back reaming process, just before the back reamer 22 reaches each support hook 20.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A method of replacing a section of existing underground pipe, the section having opposite ends, comprising:
    drilling a series of vertical holes between the opposite ends of the pipe section, each hole intersecting the pipe section to form openings in the pipe section between the opposite ends;
    supplying slurry material downwardly through the vertical holes to fill the existing pipe section;
    then drilling with a boring tool in a first direction to form a pilot hole through the existing pipe section;
    then reaming the pilot hole with a reaming tool in a second direction opposite the first direction to enlarge the diameter of the pilot hole and to break up the existing pipe section;
    installing a new pipe in the enlarged hole, with the new pipe installation forcing the slurry and broken pipe section upwards into the vertical holes; and
    removing the slurry and broken pipe through the vertical holes.

2. The method of claim 1 further comprising pulling the new pipe behind the reaming tool.

3. The method of claim 1 wherein the reaming and installing steps are performed simultaneously.

4. The method of claim 1 further comprising supplying liquid during the reaming step to form additional slurry in the enlarged hole.

5. The method of claim 4 wherein the additional slurry is used as a cutting agent to assist in removing the existing pipe.

6. The method of claim 4 further comprising supporting the new pipe with the additional slurry to minimize floating of the new pipe.

7. The method of claim 1 further comprising supporting the boring tool at each sight relief hole with a hook extending downwardly through each hole to an elevation of the broken pipe.

8. The method of claim 5 wherein the slurry material keeps the boring tool on the hook.

9. The method of claim 1 further comprising lubricating the reaming tool with the slurry material.

10. The method of claim 1 wherein the reaming tool has a diameter larger than the diameter of the existing pipe.

11. The method of claim 1 wherein the reaming, tool has a diameter no more than ½" greater than the diameter of the new pipe.

12. The method of claim 1 further comprising dampening movement of the pilot stem with the slurry material during drilling of the pilot hole.

13. A method of removing and replacing a section of an existing underground pipe, comprising:
    drilling holes in the ground and through the pipe between ends of the section to be removed; then
    supplying slurry material through the holes to substantially fill the pipe; then
    extending a pilot stem through the pipe and slurry material in a first direction whereby non-axial movement of the pilot stem is dampened by the slurry material;
    back reaming through the pipe in an opposite second direction with a reaming tool to break up the pipe; and then
    pulling a new pipe into position behind the reaming tool.

14. The method of claim 13 further comprising adding liquid during the drilling step to form the slurry material.

15. The method of claim 13 further comprising removing the broken pipe and slurry out the holes.

16. The method of claim 13 further comprising forcing the broken pipe and slurry upwardly into the holes with the new pipe.

17. The method of claim 13 further comprising supplying liquid during the reaming step to form additional slurry.

18. The method of claim 17 further comprising supporting the new pipe with the additional slurry to minimize floating of the new pipe.

19. The method of claim 13 wherein the reaming and pulling steps are performed simultaneously.

20. The method of claim 13 further comprising maintaining a desired grade for the pilot stem using a plurality of hooks to support the pilot stem.

* * * * *